US 10,488,246 B1

United States Patent
Hsieh

(10) Patent No.: US 10,488,246 B1
(45) Date of Patent: Nov. 26, 2019

(54) ESCAPE SYSTEM FOR A SINKING CAR AND ULTRASONIC COMPONENT THEREOF

(71) Applicant: Jr-Hui Hsieh, Taoyuan (TW)

(72) Inventor: Jr-Hui Hsieh, Taoyuan (TW)

(*) Notice: Subject to any disclaimer, the term of this patent is extended or adjusted under 35 U.S.C. 154(b) by 0 days.

(21) Appl. No.: 16/180,106

(22) Filed: Nov. 5, 2018

(30) Foreign Application Priority Data

Sep. 28, 2018 (CN) .......................... 2018 1 1136696

(51) Int. Cl.
| | | |
|---|---|---|
| *G01F 23/296* | (2006.01) | |
| *B60R 21/01* | (2006.01) | |
| *B60R 21/23* | (2006.01) | |
| *G08B 21/08* | (2006.01) | |
| *B60R 21/00* | (2006.01) | |

(52) U.S. Cl.
CPC .......... *G01F 23/2965* (2013.01); *B60R 21/01* (2013.01); *B60R 21/23* (2013.01); *G01F 23/2962* (2013.01); *G08B 21/08* (2013.01); *B60R 2021/0016* (2013.01); *B60R 2021/0027* (2013.01); *B60R 2021/01211* (2013.01); *B60R 2021/01252* (2013.01); *B60R 2021/01286* (2013.01)

(58) Field of Classification Search
None
See application file for complete search history.

(56) References Cited

U.S. PATENT DOCUMENTS

| | | | | |
|---|---|---|---|---|
| 6,327,220 | B1 * | 12/2001 | Miller, Jr. .............. | H04B 11/00 367/134 |
| 6,337,550 | B1 * | 1/2002 | Takahashi .................. | B60J 1/17 318/286 |
| 10,150,439 | B1 * | 12/2018 | Hsieh .................. | B60R 21/0136 |

(Continued)

FOREIGN PATENT DOCUMENTS

| | | |
|---|---|---|
| CN | 204595646 U | 8/2015 |
| CN | 107554467 A | 1/2018 |

(Continued)

OTHER PUBLICATIONS

1st office action for corresponding TW Application No. 107134406, dated Dec. 19, 2018.

*Primary Examiner* — Steven Lim
*Assistant Examiner* — Muhammad Adnan
(74) *Attorney, Agent, or Firm* — Jackson IPG PLLC; Demian K. Jackson

(57) ABSTRACT

An escape system for a sinking car and an ultrasonic component thereof are illustrated. In the present disclosure, an ultrasonic signal transmitting unit capable of emitting ultrasonic is installed on the car. When the car falls into the water, based upon an acoustic resistance concept which the ultrasonic propagated in air collides and transmits into the water, a difference between a reflection or transmittance rate of the ultrasonic and a corresponding set value can be calculated, or alternatively, a difference between a reflection time deviation or a reflection distance of the ultrasonic and a corresponding set value can be calculated. Therefore, a warning signal indicating that the car falls into the water can be fast sent, and this makes sure that the rescue opportunity which the car falls into the water can be grasped to decrease the damage or death of the user.

19 Claims, 8 Drawing Sheets

(56) References Cited

U.S. PATENT DOCUMENTS

| | | | | |
|---|---|---|---|---|
| 2009/0295566 | A1* | 12/2009 | Weintraub | G08B 21/088 340/539.11 |
| 2011/0294382 | A1* | 12/2011 | Puls | B63C 9/0005 441/89 |
| 2014/0165898 | A1* | 6/2014 | Cierpka | G01S 15/89 114/312 |
| 2015/0068440 | A1* | 3/2015 | Minnock | B63G 8/001 114/312 |

FOREIGN PATENT DOCUMENTS

| | | | |
|---|---|---|---|
| CN | 107640117 A | | 1/2018 |
| CN | 108437921 A | * | 8/2018 |
| KR | 1020160058442 A | | 5/2016 |

* cited by examiner

ESCAPE SYSTEM FOR A SINKING CAR AND ULTRASONIC COMPONENT THEREOF

BACKGROUND

1. Technical Field

The present disclosure relates to an escape system and an ultrasonic component thereof, in particular, to an escape system for a sinking car and an ultrasonic component thereof, which are helpful to fast receive information indicating the car has been fallen into the water and quickly send the information, so as to grasp a rescue opportunity.

2. Description of Related Art

Propaganda materials of governments teaches people that a car head easily fall downward due to a weight of an engine of the car head when the car driven by a user accidently falls into water, and under such condition, the user in the car should keep calm, unlock a locked seat belt in the first time, then open a car window as soon as possible, and climb out via the car window before the car has completely fallen into the water. If the car has fallen into the water, the car window is hard to be opened since the interior and exterior of the car window have a pressure deviation due to the water pressure, and the automatic car window also cannot be activated since the water has flowed into the electronic component of the car. Meanwhile, the car will complete fallen into the water in about 90 seconds, and the user must find a sharp object and use the sharp object to break up a front or back window to grasp the escape opportunity. If the user cannot grasp the escape opportunity in the short time period of 90 seconds, the rescue opportunity of the user is very little.

One technology is provided to solve the above problem. The self-rescue system comprises a car body, an inflating structure, a water level sensor and a control unit. The car body has a side on which the inflating structure is disposed, and the inflating structure comprises a high pressure gas bottle, a floating ball and a floating ball control module, wherein the high pressure gas bottle is disposed in the car body, the floating ball is disposed outside the car body, and the floating ball control module is connected to the high pressure gas bottle and the floating ball, and comprises a fixing ring, a switch activator for inflating the gas bottle and a driver. The water level sensor is disposed outside the car body, and the control unit is electrically connected to the water level sensor and the floating ball control module. Thus, when the water level sensor detects that the water level is too high, the inflating structure is activated to quickly inflate the floating ball of the inflating structure, such that it prevents the car body from falling into the water to rescue the life the user. Further, the top end of the headlight has a help light, and the help light can flash, such that the user can wait to be rescued. However, when the car falls into the water, the water level sensor and the floating ball is pulled upward due to the water floating force, but because of the tension force of the spring being the resisting force, the activating time of the inflating ball is affected and the signal transmitting time of the water level sensor is delayed. Thus, the inflation time of the inflating ball is delayed, and it decreases the rescue chance of the user in the car. Accordingly, how to utilize a novel design to efficiently help the car falling into the water to transmit the rescue signal quickly for grasping the rescue opportunity is an important issue which the researcher or manufacture in the field of the escape system for the sinking car tries to solve and overcome.

SUMMARY

The present disclosure mainly provides an escape system for a sinking car and an ultrasonic component thereof, and both of them are helpful to fast receive information indicating the car has been fallen into the water and quickly send the information, so as to grasp a rescue opportunity. Mainly, an ultrasonic signal transmitting unit capable of emitting ultrasonic is installed on the car. When the car falls into the water, based upon an acoustic resistance concept which the ultrasonic propagated in air collides and transmits into the water, a difference between a reflection or transmittance rate of the ultrasonic and a corresponding set value can be calculated; further, or alternatively, when the car falls into the water, a difference between a reflection time deviation or a reflection distance of the ultrasonic and a corresponding set value can be calculated. Therefore, a warning signal indicating that the car falls into the water can be fast sent, and this makes sure that the rescue opportunity which the car falls into the water can be grasped to decrease the damage or death of the user.

According to an objective of the present disclosure, an ultrasonic component is provided, the ultrasonic component at least comprises a case having a housing space therein and an ultrasonic module disposed in the housing space. At least one side of the case has at least a perforation, and two sides of the perforation have at least two masking pieces being disposed corresponding to the two sides of the perforation, wherein the masking piece and the side of the case have an angle therebetween. The ultrasonic module comprises an ultrasonic signal transmitting unit, a receiving unit, a calculating unit electrically connected to the receiving unit and a signal transmitting unit electrically connected to the calculating unit. the ultrasonic signal transmitting unit emits an ultrasonic, the receiving unit receives the ultrasonic; The receiving unit analyzes a speed of the ultrasonic and converts the speed of the ultrasonic to a transmittance rate or a reflection rate, or the receiving unit analyzes a time deviation between a time which the ultrasonic signal transmitting unit emits the ultrasonic and a time which the receiving unit receives the ultrasonic, or the receiving unit analyzes a reflection distance according to the time deviation. The calculating unit compares the transmittance rate sent from the receiving unit to a built-in transmittance rate set value, or the calculating unit compares the reflection rate sent from the receiving unit to a built-in reflection rate set value, or the calculating unit compares the time deviation sent from the receiving unit to a built-in time deviation set value, or the calculating unit compares the reflection distance sent from the receiving unit to a built-in reflection distance set value. When the transmittance rate is different from the built-in transmittance rate set value, or when the reflection rate is different from the built-in reflection rate set value, or when the time deviation is different from the built-in time deviation set value, or when the reflection distance is different from the built-in reflection distance set value, the calculating unit generates a warning signal which indicates the car has been fallen into water to the signal transmitting unit, and the signal transmitting unit transmits the warning signal via a wired manner or a wireless manner.

According to the above ultrasonic component, wherein the ultrasonic signal transmitting unit and the receiving unit are disposed on a side of the housing space, and when the ultrasonic signal transmitting unit transmits the ultrasonic, a start time is synchronously transmitted to the receiving unit; the ultrasonic has a reflected wave, the receiving unit receives the reflected wave and marks a receiving time, and the receiving unit subtracts the start time from the receiving time to obtain the time deviation.

According to the above ultrasonic component, wherein when the time deviation is less than the time deviation set value, the calculating unit generates the warning signal to the signal transmitting unit.

According to the above ultrasonic component, wherein the time deviation set value is the time deviation which the ultrasonic collides a bottom of the case to generate the reflected wave.

According to the above ultrasonic component, wherein the reflection distance is a product which the half time deviation multiplies the speed of the ultrasonic, or the reflection distance is a product which the time deviation multiplies the speed of the ultrasonic.

According to the above ultrasonic component, wherein when the reflection distance is less than the reflection distance set value, the calculating unit generates the warning signal to the signal transmitting unit.

According to the above ultrasonic component, wherein the ultrasonic signal transmitting unit and the receiving unit are disposed on two opposite sides of the housing space.

According to the above ultrasonic component, wherein the ultrasonic signal transmitting unit emits the ultrasonic forward the receiving unit.

According to the above ultrasonic component, wherein the ultrasonic has a transmittance wave, and when the receiving unit analyzes a speed of the transmittance wave, the receiving unit analyzes the transmittance rate.

According to the above ultrasonic component, wherein when the transmittance rate is larger than the transmittance rate set value, the calculating unit generates the warning signal to the signal transmitting unit.

According to the above ultrasonic component, wherein the transmittance rate set vale is 0.

When the receiving unit analyzes that a speed of the transmittance wave is larger than the speed of the ultrasonic, the receiving unit analyzes the reflection rate.

According to the above ultrasonic component, wherein the receiving unit analyzes the reflection rate according to the transmittance rate. When the reflection rate is less than the reflection rate set value, the calculating unit generates the warning signal to the signal transmitting unit.

According to the above ultrasonic component, wherein the built-in reflection rate set value is 1.

According to the above ultrasonic component, wherein the angle is 5 degrees through 65 degrees.

According to the above ultrasonic component, wherein the ultrasonic signal transmitting unit is an ultrasonic signal transmitting component or an ultrasonic signal transmitting device.

According to the above ultrasonic component, wherein an inner side of the perforation further has a permeable layer, and the permeable layer is a fiber material layer or a cloth layer.

Further, according to the objective of the present disclosure, an escape system for a sinking car is provided and installed on the car. The escape system for the sinking car at least comprises at least one of the above ultrasonic components and a main board electrically connected to the ultrasonic component. When the main board receives the warning signal transmitted from signal transmitting unit, the main board is electrically connected to a motor of the car to open at least one car window, and the main board is electrically connected to an electromagnetic switch to unlock at least one seat belt.

According to the escape system for the sinking car, wherein the escape system for the sinking car further comprises an uninterrupted power system which makes power of the escape system for the sinking car be uninterrupted.

According to the escape system for the sinking car, wherein the escape system for the sinking car is electrically connected to a device of the car or a mobile telecommunication apparatus held by a user in the car, the device has a an application installed therein, and when receiving the warning signal, the escape system for the sinking car activates an automatically locating function of the application.

According to the escape system for the sinking car, wherein the application sends a help message or dials a help call via a voice assistant or an automatically dialing function.

According to the escape system for the sinking car, wherein the main board is electrically connected to a speaker of the car, such than the speaker is activated to loud when the main board receives the warning signal.

According to the escape system for the sinking car, wherein the main board has a control unit being electrically connected to the motor, headlights and at least a speaker.

BRIEF DESCRIPTION OF THE DRAWINGS

The accompanying drawings are included to provide a further understanding of the present disclosure, and are incorporated in and constitute a part of this specification. The drawings illustrate exemplary embodiments of the present disclosure and, together with the description, serve to explain the principles of the present disclosure. The accompanying drawing are listed as follows.

DESCRIPTION OF THE EXEMPLARY EMBODIMENTS

To understand the technical features, content and advantages of the present disclosure and its efficacy, the present disclosure will be described in detail with reference to the accompanying drawings. The drawings are for illustrative and auxiliary purposes only and may not necessarily be the true scale and precise configuration of the present disclosure.

Therefore, the scope of the present disclosure should not be limited to the scale and configuration of the attached drawings.

Figure 1A:
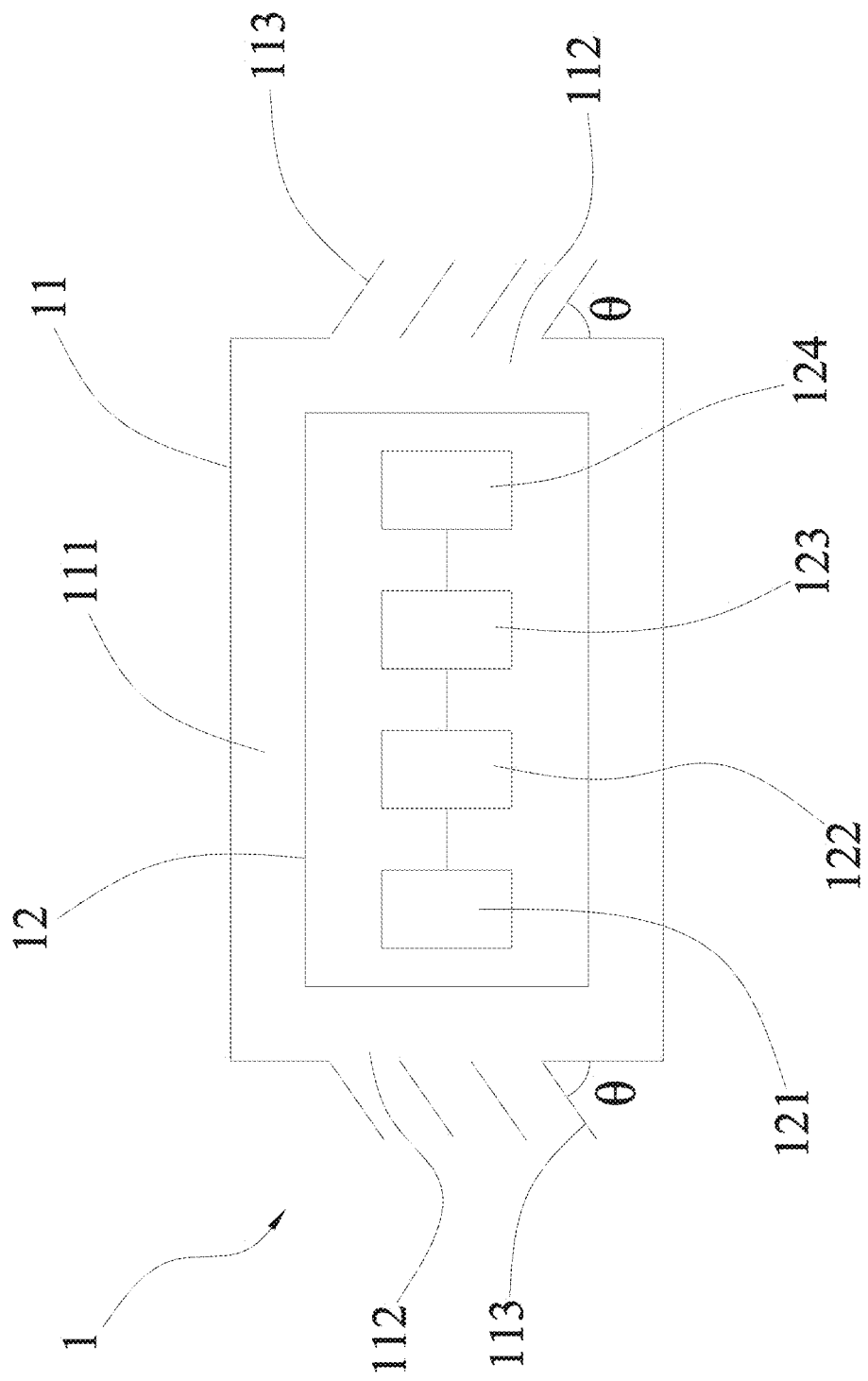
FIG. 1A is a block diagram of an ultrasonic component according to an embodiment of the present disclosure.
Figure 1B:
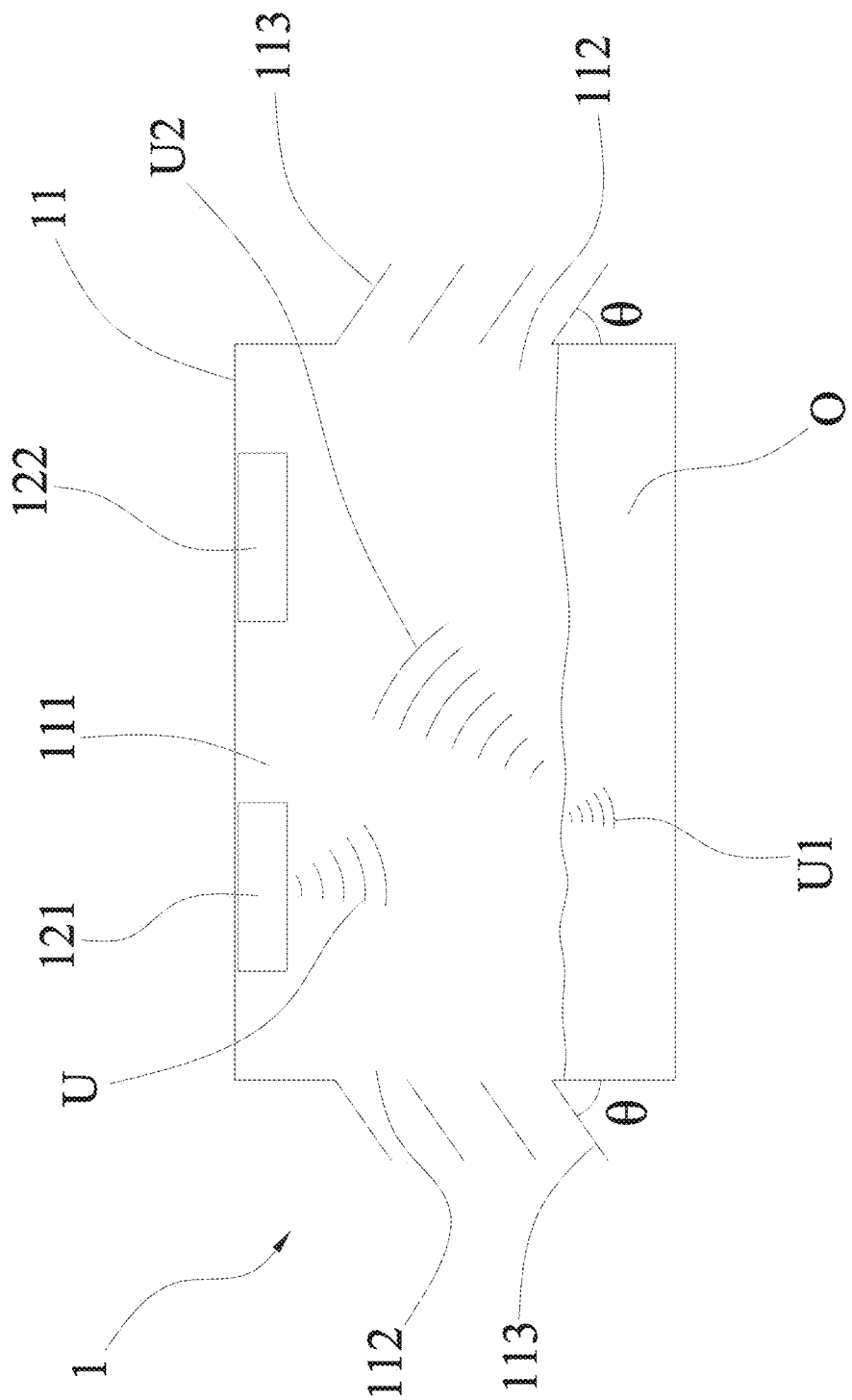
FIG. 1B is a first schematic block diagram of an ultrasonic component according to an embodiment of the present disclosure.
Figure 1C:
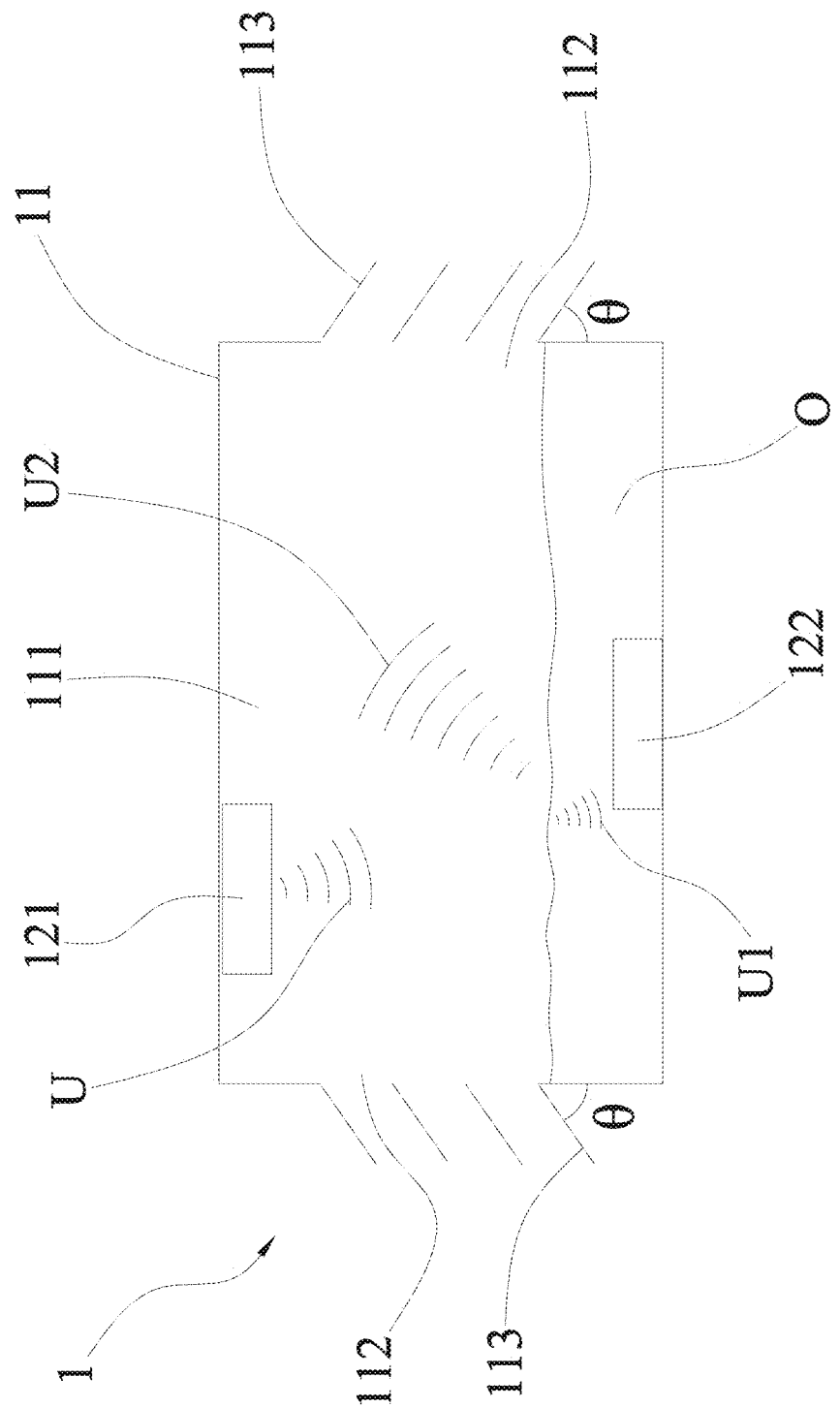
FIG. 1C is a second schematic block diagram of an ultrasonic component according to an embodiment of the present disclosure.

Firstly, referring to FIG. 1A through FIG. 1C, an ultrasonic component (1) of the present disclosure at least comprises a case (11) and an ultrasonic module (12).

The case (11) has a housing (111) space therein, wherein at least one side of the case (11) has at least a perforation (112), and two sides of the perforation (112) have at least two masking pieces (113) being disposed corresponding to the two sides of the perforation (112), wherein the masking piece (113) and the side of the case (11) have an angle (θ) therebetween. The angle (θ) can be 5 degrees through 65 degrees, for example. In a preferred embodiment, the case (11) is a square case, and interior of the case is formed with the housing space (111), the housing space (111) is filled with air, and each of a left and right sides of the case (11) has the corresponding perforation (112), and each of a top and bottom sides of the perforation (112) has the corresponding masking piece (113). Preferably, the masking pieces (113) located on the top and bottom sides of the perforation (112) are parallel to each other, the side of the case (11) and one masking piece (113) of the corresponding perforation (112) therebetween have the angle (θ) being 5 degrees through 65 degrees, and the side of the case (11) and other one masking piece (113) of the corresponding perforation (112) therebetween have a complementary angle of the angle (θ). The angle (θ) between the masking piece (113) and the side of the case (11) can be used to prevent the water from splashing into the interior of the case when the user washes his/her car or it rains, and thus the false determination is avoided.

The ultrasonic module (12) is disposed in the housing space (111), and the ultrasonic module (12) comprises an ultrasonic signal transmitting unit (121), a receiving unit (122), a calculating unit (123) electrically connected to the receiving unit (122) and a signal transmitting unit (124) electrically connected to the calculating unit (123). Preferably, the receiving unit (122) is electrically connected to the ultrasonic signal transmitting unit (121), or alternatively, the calculating unit (123) is electrically connected to the ultrasonic signal transmitting unit (121). The ultrasonic signal transmitting unit (121) emits an ultrasonic (U) continuously or every period, the receiving unit (122) receives the ultrasonic (U), and preferably, the ultrasonic signal transmitting unit (121) transmits the speed, frequency and wavelength of the ultrasonic (U) to the receiving unit (122). The receiving unit (122) analyzes the speed of the ultrasonic (U) and converts it to a transmittance rate or a reflection rate, or alternatively, the receiving unit (122) analyzes a time deviation between a time which the ultrasonic signal transmitting unit (121) emits the ultrasonic (U) and a time which the receiving unit (122) receives the ultrasonic (U), or alternatively, the receiving unit (122) analyzes a reflection distance according to the time deviation.

To put it more concretely, after the ultrasonic (U) contacts an obstacle (O) (refer to FIG. 1B and FIG. 1C), the ultrasonic (U) transmits into the obstacle (O) to generate a transmittance wave (U1) and collides the obstacle (O) to generate a reflected wave (U2). In other words, the ultrasonic (U) has the transmittance wave (U1) and the reflected wave (U2). The receiving unit (122) analyzes the speed of the transmittance wave (U1) and converts it to the transmittance rate and the reflection rate of the obstacle (O), or alternatively, the receiving unit (122) analyzes the time deviation between the time which the ultrasonic signal transmitting unit (121) emits the ultrasonic (U) and the time which the receiving unit (122) receives the reflected wave (U2), or alternatively, the receiving unit (122) analyzes the reflection distance between the obstacle (O) and the ultrasonic module (12) according to the time deviation.

Next, the calculating unit (123) compares the transmittance rate send from the receiving unit (122) to a built-in transmittance rate set value, or alternatively, the calculating unit (123) compares the reflection rate sent from the receiving unit (122) to a built-in reflection rate set value, or alternatively, the calculating unit (123) compares the time deviation sent from the receiving unit (122) to a built-in time deviation set value, or alternatively, the calculating unit (123) compares the reflection distance sent from the receiving unit (122) to a built-in reflection distance set value. When the transmittance rate is different from the built-in transmittance rate set value, or when the reflection rate is different from the built-in reflection rate set value, or when the time deviation is different from the built-in time deviation set value, or when the reflection distance is different from the built-in reflection distance set value, the calculating unit (123) generates a warning signal which indicates the car has been fallen into water to the signal transmitting unit (124), and the signal transmitting unit (124) transmits the warning signal via a wired manner or a wireless manner. For example, when the transmittance rate is larger than the transmittance rate set value, or when the reflection rate is less than the reflection rate set value, or when the time deviation is less than the time deviation set value, or when the reflection distance is less than the reflection distance set value, the calculating unit (123) generates the warning signal to the signal transmitting unit (124), and the signal transmitting unit (124) the signal transmitting unit (124) transmits the warning signal via the wired manner or the wireless manner. Further, the ultrasonic signal transmitting unit (121) is one of an ultrasonic signal transmitting component or an ultrasonic signal transmitting device. In a preferred embodiment of the present disclosure, the ultrasonic signal transmitting unit (121) is the ultrasonic signal transmitting component which emits the ultrasonic (U), and the receiving unit (122) receives the ultrasonic (U) emitted by the ultrasonic signal transmitting unit (121) and analyzes the transmittance rate, the reflection rate, the time deviation and the reflection distance.

Referring to FIG. 1B simultaneously, the ultrasonic signal transmitting unit (121) and the receiving unit (122) are disposed on one side of the housing space (111), for example, the ultrasonic signal transmitting unit (121) and the receiving unit (122) are disposed on the top side of the housing space (111), and the ultrasonic signal transmitting unit (121) synchronously transmits a start time to the receiving unit (122) when emitting the ultrasonic (U). The ultrasonic signal transmitting unit (121) emits the ultrasonic (U) forward the bottom side of the housing space (111), and next, the ultrasonic (U) collides the obstacle (O) disposed on the bottom side of the housing space (111) to generate the reflected wave (U2). In the embodiment, the obstacle (O) is the water, and for example, the water flows to the housing space (111) via the perforation (112). The portion of the housing space (111) being not occupied by the water is filled with the air, and the receiving unit (122) receives the reflected wave (U2) and marks a receiving time. The receiving unit (122) subtracts the start time from the receiving time to obtain the time deviation, and the receiving unit (122) transmits the time deviation to the calculating unit (123). The calculating unit (123) has the built-in time deviation set value, and the calculating unit (123) calculates the difference between the time deviation and the built-in time deviation set value (or compares the time deviation to the built-in time deviation set value), when the time deviation and the built-in time deviation set value are different from each other, for example, the time deviation is less than the time deviation set value, the calculating unit (123) generates the warning signal to the signal transmitting unit (124), and next, the signal transmitting unit (124) transmits the warning signal via the wireless or wired manner. It is noted that, when the housing space (111) has no obstacle (O), the ultrasonic (U) directly collides the bottom side of the case (11) to generate the reflected wave (U2), and the measured time deviation now can be the time deviation set value.

In addition, the receiving unit (122) analyzes the time deviation to calculate the reflection distance between the obstacle (O) and the ultrasonic module (12), the reflection distance is a which the half time deviation multiplies the speed of the ultrasonic (U), or the reflection distance is a product which the time deviation multiplies the speed of the ultrasonic (U), or the reflection distance is a product which the half time deviation multiplies the speed of the reflected wave (U2), and the receiving unit (122) transmits the refection distance to the calculating unit (123). The calculating unit (123) has the built-in reflection distance set value, the calculating unit (123) calculates a difference between the reflection distance and the built-in reflection distance set value (or compared the reflection distance to the built-in reflection distance set value). When the reflection distance is different from the built-in reflection distance set value, for example, the reflection distance is less than the reflection rate set value, the calculating unit (123) generates the warning signal to the signal transmitting unit (124). Next, the signal transmitting unit (124) transmits the warning signal via the wireless or wired manner. It is noted that, when the housing space (111) has no obstacle (O), the ultrasonic (U) directly collides the bottom side of the case (11) to generate the reflected wave (U2), the measured time deviation now can be the time deviation set value, and the reflection distance set value is the product which the half time deviation set value multiplies the speed of the ultrasonic (U), or the reflection distance set value is the product which the half time deviation set value multiplies the speed of the reflected wave (U2).

Referring to FIG. 1C simultaneously, the ultrasonic signal transmitting unit (121) and the receiving unit (122) are disposed on two opposite sides of the housing space (111), for example, the ultrasonic signal transmitting unit (121) is disposed on the top side of the housing space (111), and the receiving unit (122) is disposed on the bottom side of the housing space (111). The ultrasonic signal transmitting unit (121) emits the ultrasonic (U) forward the bottom side of the housing space (111), and preferably, the ultrasonic signal transmitting unit (121) emits the ultrasonic (U) forward the receiving unit (122). Next, the ultrasonic transmits into the obstacle (O) disposed on the bottom side of the housing space (111) to generate the transmittance wave (U1), and in the embodiment, the obstacle (O) is the water which covers the receiving unit (122). For example, the water flows to the housing space (111) to cover the receiving unit (122) via the perforation (112). The portion of the housing space (111) being not occupied by the water is filled with the air, and the receiving unit (122) receives the transmittance wave (U1) to analyze the speed and the transmittance rate of the transmittance wave (U1). For example, when the receiving unit (122) analyzes that the speed of the transmittance wave (U1) is larger than the speed of the ultrasonic (U), the receiving unit (122) calculates the transmittance rate, and then the receiving unit (122) transmits the transmittance rate to the calculating unit (123). The calculating unit (123) has the built-in transmittance rate set value, preferably, the transmittance rate set value can be 0. The calculating unit (123) calculates a difference between the transmittance rate and the transmittance rate set value (or compares the transmittance rate to the transmittance rate set value), and when the transmittance rate is different from the transmittance rate set value, for example, the transmittance rate is larger than the transmittance rate set value, or when the transmittance rate is larger than, the calculating unit (123) generates the warning signal to the signal transmitting unit (124). Then, the signal transmitting unit (124) transmits the warning signal via the wireless or wired manner. It is noted that, an uncompressible rate of the water is $2.2 \times 10^9$ (Pa), an uncompressible rate of the air is $1 \times 10^5$ (Pa) being less than that of the water, and the speed of the ultrasonic increases as the uncompressible rate of the material increases. Therefore, when the car falls into the water, and the water covers the receiving unit (122), the speed of the transmittance wave (U1) is larger than that of the ultrasonic (U).

The receiving unit (122) analyzes the transmittance rate by using an equation as follows:

$$T = \frac{4\rho_1 C_1 \rho_2 C_2}{(\rho_1 C_1 + \rho_2 C_2)^2};$$

wherein T is the transmittance rate, $\rho_1$ is an air density, $C_1$ is the speed of the ultrasonic (U), $\rho_2$ is a water density, and $C_2$ is the speed of the transmittance wave (U1); $\rho_1$, $\rho_2$ and $C_1$ are independent and different constant values stored in the receiving unit, and $C_2$ is measured by the receiving unit (122). In the embodiment of FIG. 1C, the obstacle (O) is the water, and the portion of the housing space (111) being not occupied by the water is filled with the air. For example, under the following condition, $\rho_1$=0.0012 g/cm$^3$, $C_1$=0.331× 10$^5$ cm/sec, $\rho_2$=1.00 g/cm$^3$, and $C_2$=1.43×10$^5$ cm/sec, the calculated transmittance rate T equals to 0.00117. In the embodiment that the transmittance rate set value is 0, the calculating unit (123) calculates a difference between the transmittance rate and the transmittance rate set value (or compares the transmittance rate to the transmittance rate set value), and when the transmittance rate (T=0.00117) is larger than the transmittance rate set value (0), the calculating unit (123) generates the warning signal to the signal transmitting unit (124). Then, the signal transmitting unit (124) transmits the warning signal via the wireless or wired manner.

The receiving unit (122) analyzes the reflection rate by an equation as follows:

$$R = \frac{(\rho_1 C_1 - \rho_2 C_2)^2}{(\rho_1 C_1 + \rho_2 C_2)^2};$$

wherein R is the reflection rate, $\rho_1$ is an air density, $C_1$ is the speed of the ultrasonic (U), $\rho_2$ is a water density, and $C_2$ is the speed of the transmittance wave (U1); $\rho_1$, $\rho_2$ and $C_1$ are independent and different constant values stored in the receiving unit, and $C_2$ is measured by the receiving unit (122). In the embodiment of FIG. 1C, the obstacle (O) is the water, and the portion of the housing space (111) being not occupied by the water is filled with the air. For example, under the following condition, $\rho_1$=0.0012 g/cm$^3$, $C_1$=0.331× 10$^5$ cm/sec, $\rho_2$=1.00 g/cm$^3$, and $C_2$=1.43×10$^5$ cm/sec, the calculated reflection rate T equals to 0.99883. In the embodiment that the reflection rate set value is 1, the calculating unit (123) calculates a difference between the reflection rate and the reflection rate set value (or compares the reflection rate to the reflection rate set value), and when the reflection rate (R=0.99883) is less than the reflection rate set value (1), the calculating unit (123) generates the warning signal to the signal transmitting unit (124). Then, the signal transmitting unit (124) transmits the warning signal via the wireless or wired manner.

The ultrasonic component (1) is especially applied to the car after the car falls into the water, by utilizing the properties of the ultrasonic (U) in two different mediums (such as, the water and air) are different from each other (i.e. the reflection rate, the transmittance rate, the time deviation and the reflection distance of the ultrasonic (U) are respectively different from the reflection rate set value, the transmittance rate set value, the time deviation set value and the reflection distance set value), whether the car falls into the water can be detected, which is helpful to fast send the information that the car has been fallen into the water and to grasp the rescue opportunity.

Figure 2:
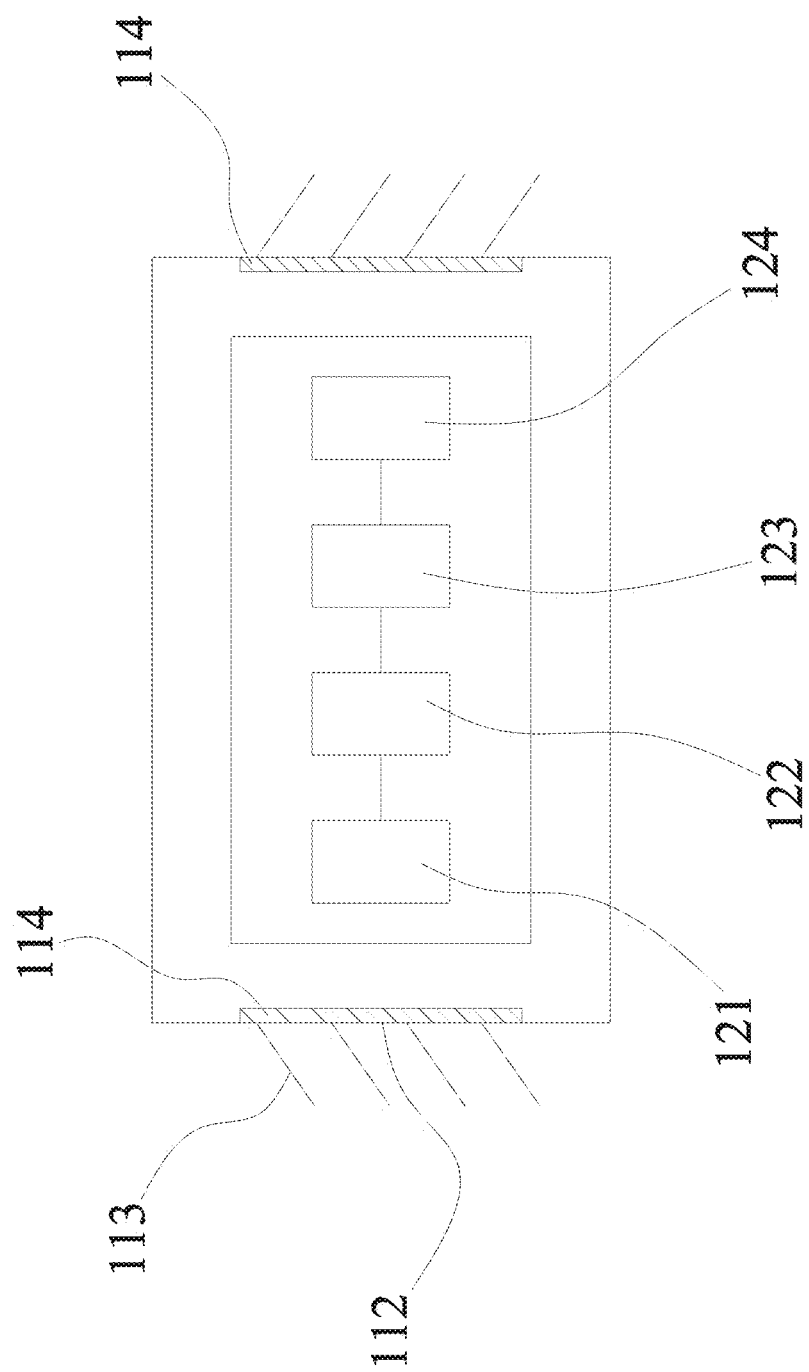
FIG. 2 is a block diagram of an ultrasonic component according to another embodiment of the present disclosure.

Further, the interior of the perforation (112) may further have a permeable layer (114), such as, a fiber material layer or a cloth layer. Referring to FIG. 2, FIG. 2 is a block diagram of an ultrasonic component according to another embodiment of the present disclosure, wherein the permeable layer (114) being the fiber material layer or the cloth layer is disposed in the interior of the perforation, which can be used to shield the outer dust, and thus it avoids the false determination of the information whether the car falls into the water due to the effect of the dust.

Figure 3:
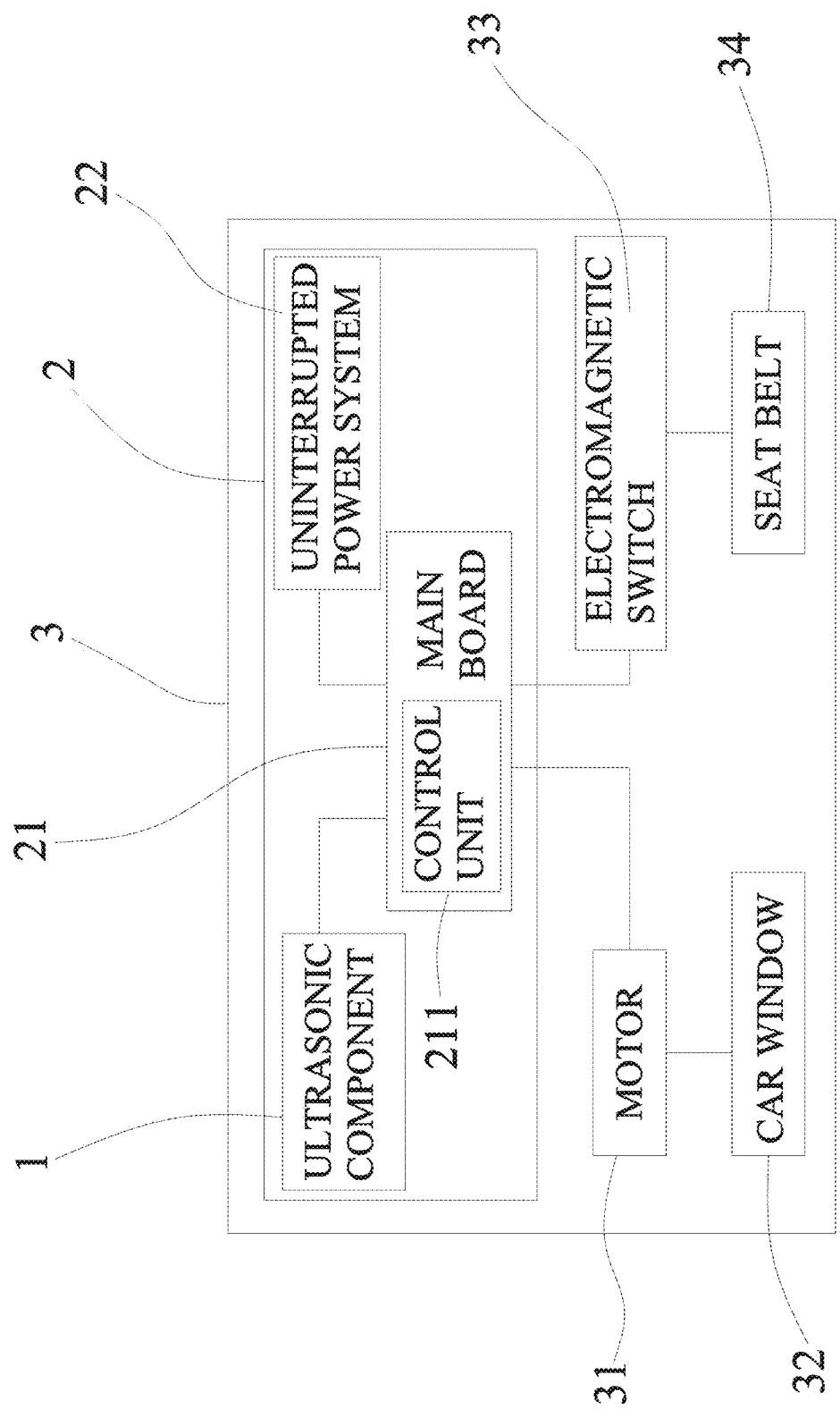
FIG. 3 is a block diagram of an escape system for a sinking car according to an embodiment of the present disclosure.
Figure 4:
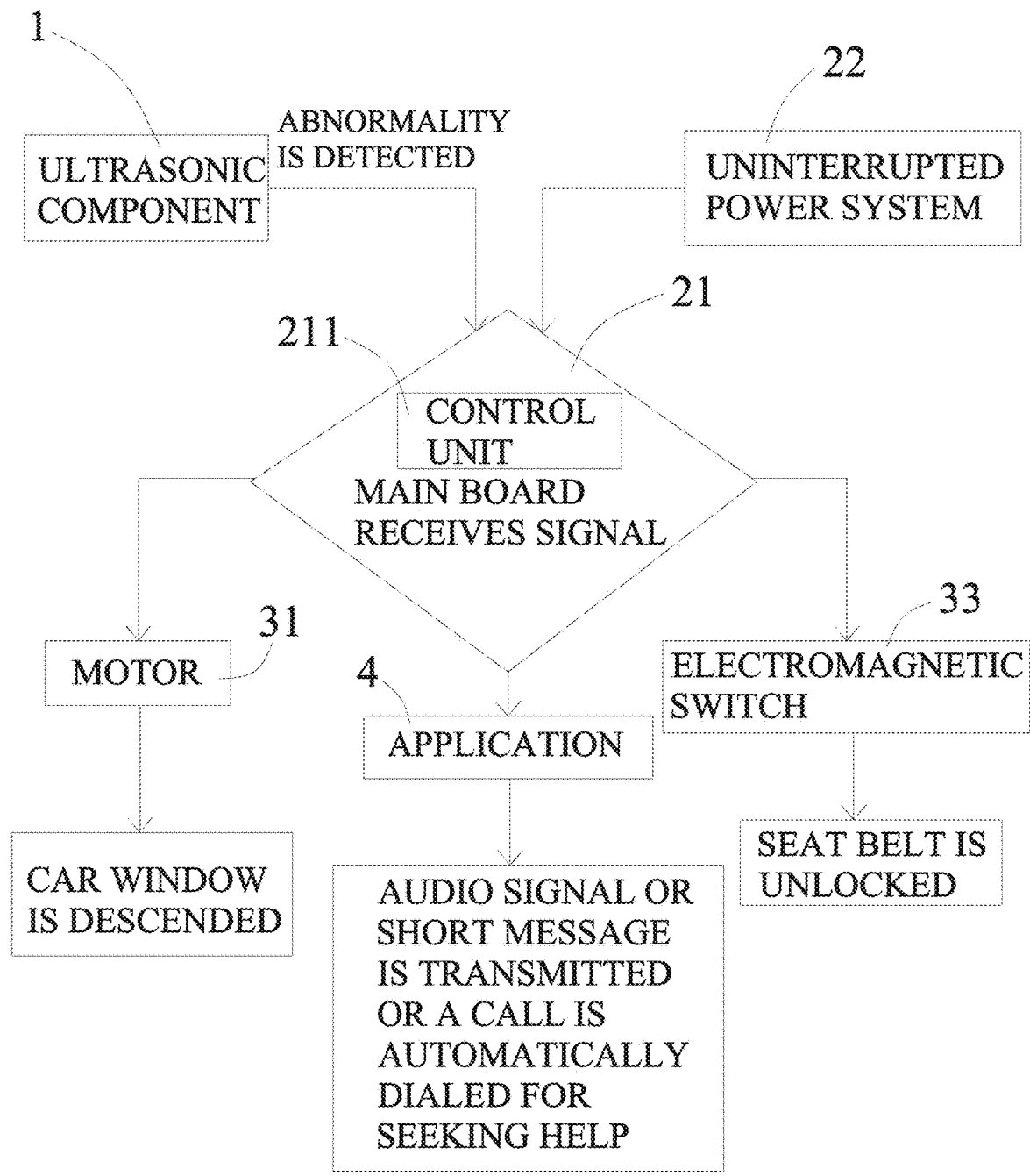
FIG. 4 is a schematic diagram of operations of an escape system for a sinking car according to an embodiment of the present disclosure.

Moreover, to achieve the above objective, the present disclosure further provides another escape system for a sinking car. Referring to FIG. 3 and FIG. 4, FIG. 3 is a block diagram of an escape system for a sinking car according to an embodiment of the present disclosure, and FIG. 4 is a schematic diagram of operations of an escape system for a sinking car according to an embodiment of the present disclosure. The escape system (2) for the sinking car (3) which is used after the car (3) falls into the water comprises at least the ultrasonic component (1) and a main board (21).

The main board (21) is electrically connected to the ultrasonic component (1), the main board (21) receives the warning signal send from the signal transmitting unit (124), the main board (21) is electrically connect to a motor (31) of the car (3) to open at least one car window (32), and further electrically connect to an electromagnetic switch (33) of the car (3) to unlock at least one seat belt (34). Further, the escape system (2) for the sinking car (3) which is used after the car (3) falls into water further has an uninterrupted power system (22), and the uninterrupted power system (22) makes the power of the escape system (2) for the sinking car (3) which is used after the car (3) falls into the water be uninterrupted. In a preferred embodiment, the escape system (2) for the sinking car (3) which is used after the car (3) falls into the water comprises the ultrasonic component (1) and the main board (21), and the main board (21) further has a control unit (211) being electrically connected to the motor (31) and the electromagnetic switch (33) of the car (3), wherein the motor (31) is electrically connected to the car window (32) of the car (3), and the electromagnetic switch (33) is electrically connected to the seat belt (34) of the car (3). When the car (3) falls into the water, the main board (21) receives the warning signal sent from the signal transmitting unit (124), the main board (21) control the motor (31) to open at least the car window (32), and controls the electromagnetic switch (33) to unlock at least the seat belt (34), such that the user in the car (3) can successfully escapes. Further, when the power of the car (3) is interrupted due to that the car (3) falls into the water, the uninterrupted power system (22) can provide the required power of the escape system (2) for the sinking car (3) which is used after the car (3) falls into the water.

Further, each of a car head front side, a car tail back side, interior of a front left car door, interior of a front right car door, interior of a back right car door and interior of a back left car door can have at least the ultrasonic component (1). When the ultrasonic component (1) disposed on the car head front side detects abnormality (i.e. the fact that the car (3) falls into the water), that is, the main board (21) receives the warning signal sent from signal transmitting unit (124), the main board (21) notices the motors to descend the car windows of the front left, front right, back left and back right car doors and to open a top window of the car (3). When the ultrasonic component (1) disposed on the car tail back side detects abnormality (i.e. the fact that the car (3) falls into the water), the main board (21) notices the motors to descend the car windows of the front left, front right, back left and back right car doors and to open a top window of the car (3). When the ultrasonic component (1) disposed on the interior of the front or back left car door detects abnormality (i.e. the fact that the car (3) falls into the water), the main board (21) notices the motors to descend the car windows of the front right and back right car doors, and the escape direction is the opposite direction of the falling direction. When the ultrasonic component (1) disposed on the interior of the front or back right car door detects abnormality (i.e. the fact that the car (3) falls into the water), the main board (21) notices the motors to descend the car windows of the front left and back left car doors. Further, the top window of the car top of the car (3) has the ultrasonic component (1), and when the ultrasonic component (1) disposed on the top window of the car top detects abnormality, the main board (21) controls the motors to close the top window and to descend car windows of all the car doors.

Figure 5:
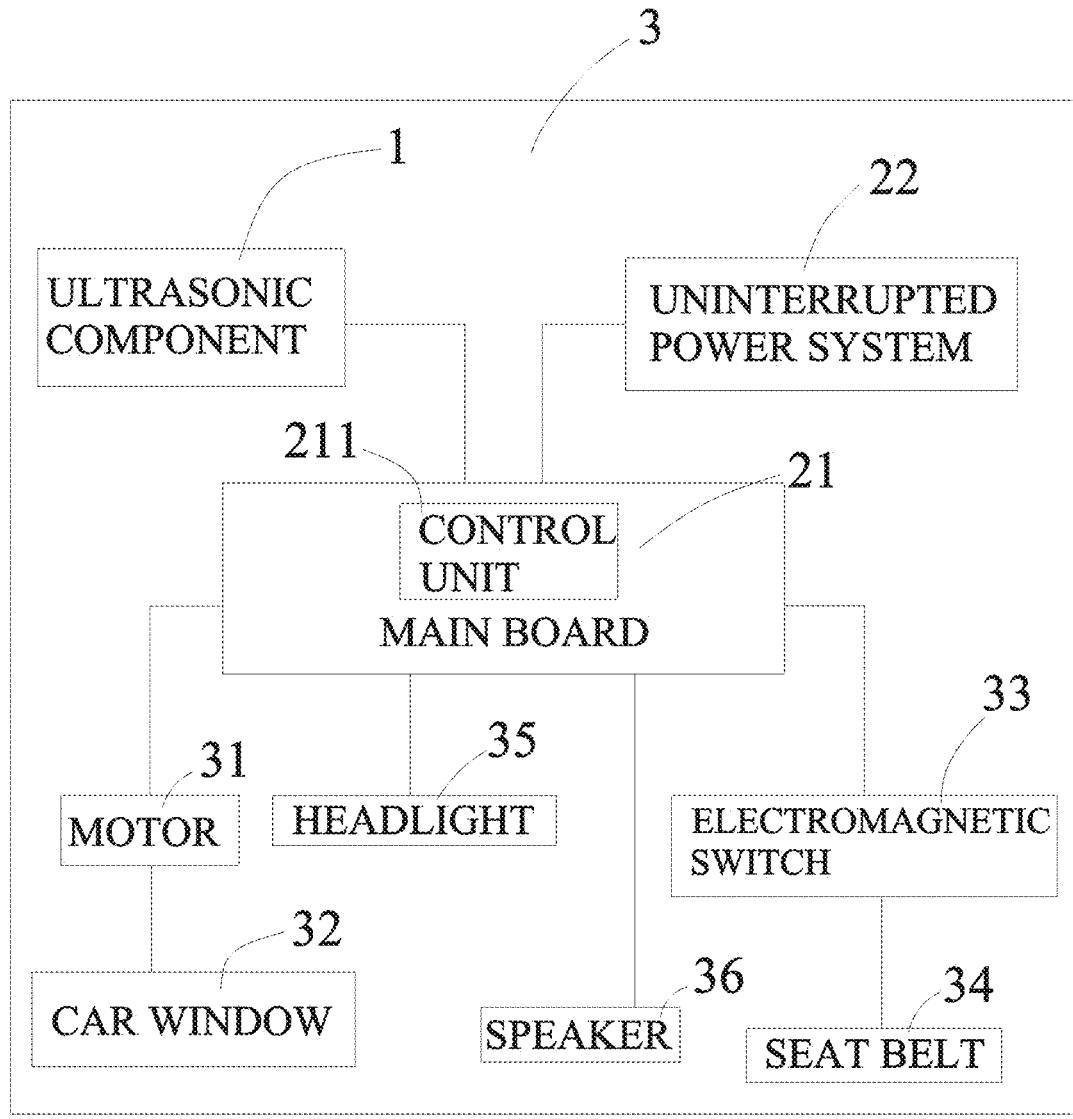
FIG. 5 is a block diagram of an escape system for a sinking car according to another embodiment of the present disclosure.

Further, referring to FIG. 5, FIG. 5 is a block diagram of an escape system for a sinking car according to another embodiment of the present disclosure, wherein the escape system (2) for the sinking car (3) which is used after the car (3) falls into water can be further electrically connected to a device of the car (3) or a mobile telecommunication device held by the user in the car (3), and the device has an application (4) installed therein. When the escape system (2) for the sinking car (3) which is used after the car (3) falls into water receives the warning signal, the automatically locating function of the application (4) is activated, wherein the application (4) further comprises one of functions of sending a help message or a help call via one of automatically dialing and a voice assistant. In a preferred embodiment of the present disclosure, the device in the car (3) is linked to Internet and installed with the application (4), and when the escape system (2) for the sinking car (3) which is used after the car (3) falls into water receives the warning signal, the escape system (2) for the sinking car (3) which is used after the car (3) is electrically connected to the device having the installed application (4), and the automatically locating function of the application (4) is activated, such that rescuers can know the location which the car (3) falls into the water. Further, when activating the automatically locating function, the application (4) can further send the help message via the voice assistant, so as to notice the rescuers.

Figure 6:
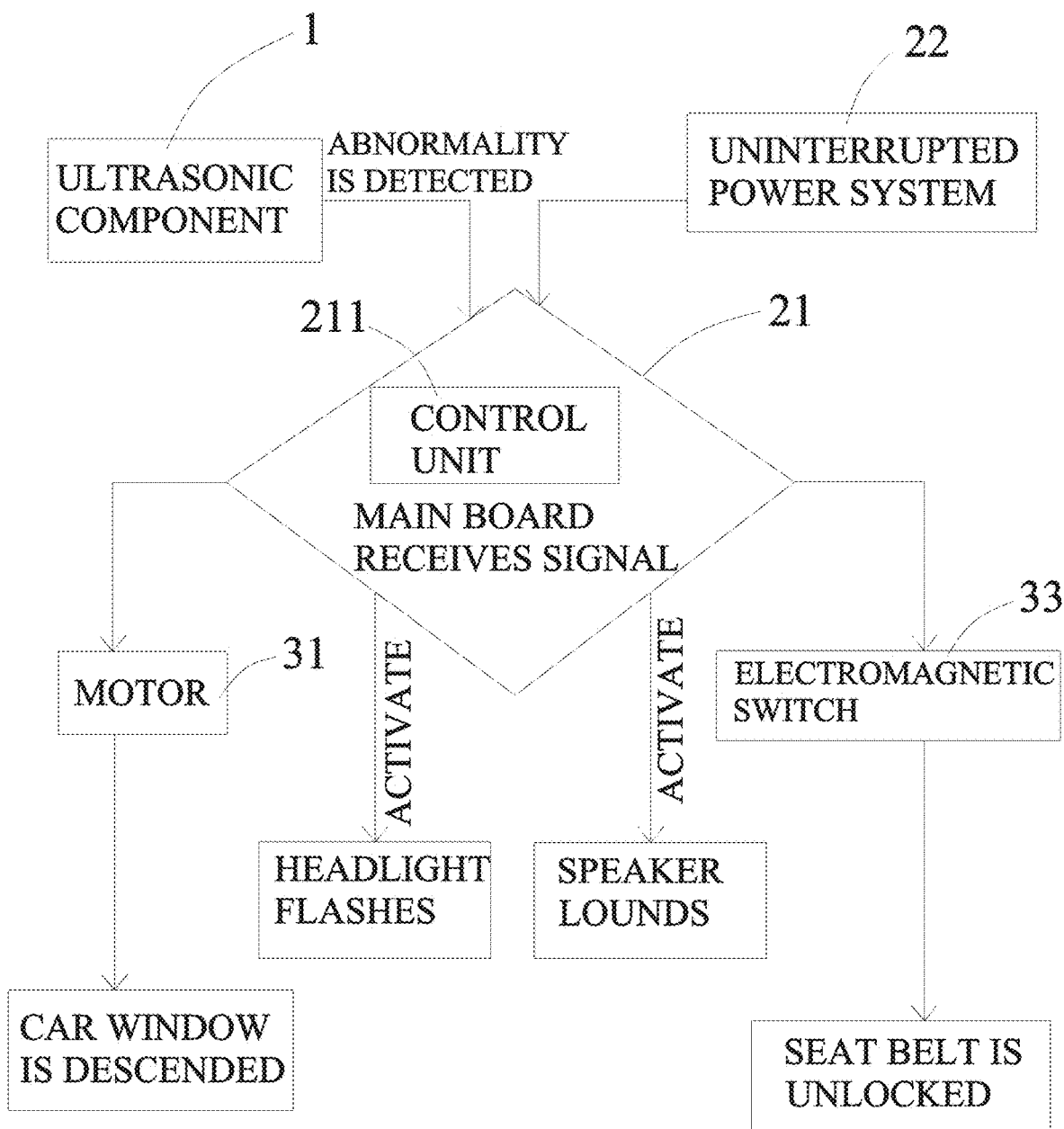
FIG. 6 is a schematic diagram of operations of an escape system for a sinking car according to another embodiment of the present disclosure.

Further, referring to FIG. 5 and FIG. 6, the control circuit (211) of the main board (21) is electrically connected to a speaker (36) and multiple headlights (35) of the car (3), and when the main board (21) receives the warning signal, the speaker (36) is activated to loud, and the headlights (35) are activated to flash. In a preferred embodiment of the present disclosure, the main board (21) of the escape system (2) for the sinking car (3) which is used after the car (3) falls into water is electrically connected to the speaker (36) of the car (3). When the escape system (2) for the sinking car (3) which is used after the car (3) falls into the water receives the warning signal, the speaker (36) is driven to loud, such that the rescuers can find the location which the car (3) falls into the water via the loud.

According to the explanations of the above embodiments, compared to the prior art and the current marketed products, the escape system for the sinking car and the ultrasonic component thereof, by utilizing the properties of the ultrasonic in two different mediums (such as, the water and air) are different from each other (i.e. the reflection rate, the transmittance rate, the time deviation and the reflection distance of the ultrasonic are respectively different from the reflection rate set value, the transmittance rate set value, the time deviation set value and the reflection distance set value), can detect whether the car falls into the water, which is helpful to fast send the information that the car has been fallen into the water and to grasp the rescue opportunity.

To sum up, the escape system for the sinking car and the ultrasonic component thereof, provided by the present disclosure, are not anticipated by publications or used in public, which have novelty and patentability. Examination of the present disclosure is respectfully requested, as well as allowance of the present disclosure.

The above-mentioned descriptions represent merely the exemplary embodiment of the present disclosure, without any intention to limit the scope of the present disclosure thereto. Various equivalent changes, alternations or modifications based on the claims of present disclosure are all consequently viewed as being embraced by the scope of the present disclosure.

What is claimed is:

1. An ultrasonic component, at least comprising:
a case having a housing space therein, at least one side of the case has at least a perforation, and two sides of the perforation have at least two masking pieces being disposed corresponding to the two sides of the perforation, wherein the masking piece and the side of the case have an angle therebetween; and
an ultrasonic module disposed in the housing space, the ultrasonic module comprises an ultrasonic signal transmitting unit, a receiving unit, a calculating unit electrically connected to the receiving unit and a signal transmitting unit electrically connected to the calculating unit;
wherein the ultrasonic signal transmitting unit emits an ultrasonic, the receiving unit receives the ultrasonic;
the receiving unit analyzes a speed of the ultrasonic and converts the speed of the ultrasonic to a transmittance rate,
the receiving unit analyzes a speed of the ultrasonic and converts the speed of the ultrasonic to a reflection rate, or the receiving unit analyzes a time deviation between a time which the ultrasonic signal transmitting unit emits the ultrasonic and a time which the receiving unit receives the ultrasonic, or the receiving unit analyzes a reflection distance according to the time deviation;
the calculating unit compares the transmittance rate sent from the receiving unit to a built-in transmittance rate set value,
the calculating unit compares the reflection rate sent from the receiving unit to a built-in reflection rate set value, or the calculating unit compares the time deviation sent from the receiving unit to a built-in time deviation set value, or the calculating unit compares the reflection distance sent from the receiving unit to a built-in reflection distance set value;
when the transmittance rate is different from the built-in transmittance rate set value,
when the reflection rate is different from the built-in reflection rate set value, or when the time deviation is different from the built-in time deviation set value, or when the reflection distance is different from the built-in reflection distance set value, the calculating unit generates a warning signal which indicates a car has been fallen into water to a signal transmitting unit, and the signal transmitting unit transmits the warning signal via a wired manner or a wireless manner;
wherein the ultrasonic has a transmittance wave, and when the receiving unit analyzes a speed of the transmittance wave, the receiving unit analyzes the transmittance rate by using an equation as follows:

$$T = \frac{4\rho_1 C_1 \rho_2 C_2}{(\rho_1 C_1 + \rho_2 C_2)^2};$$

wherein T is the transmittance rate, p, is an air density, C1 is the speed of the ultrasonic, P2 is a water density, and C2 is the speed of the transmittance wave; p, P2 and C1 are independent and different constant values stored in the receiving unit, and C2 is measured by the receiving unit.

2. The ultrasonic component according to claim 1, wherein the ultrasonic signal transmitting unit and the receiving unit are disposed on a side of the housing space, and when the ultrasonic signal transmitting unit transmits the ultrasonic, a start time is synchronously transmitted to the receiving unit; the ultrasonic has a reflected wave, the receiving unit receives the reflected wave and marks a receiving time, and the receiving unit subtracts the start time from the receiving time to obtain the time deviation.

3. The ultrasonic component according to claim 2, wherein when the time deviation is less than the time deviation set value, the calculating unit generates the warning signal to the signal transmitting unit.

4. The ultrasonic component according to claim 3, wherein the time deviation set value is the time deviation which the ultrasonic collides a bottom of the case to generate the reflected wave.

5. The ultrasonic component according to claim 2, wherein the reflection distance is a product which the half time deviation multiplies the speed of the ultrasonic, or the reflection distance is a product which the time deviation multiplies the speed of the ultrasonic.

6. The ultrasonic component according to claim 5, wherein when the reflection distance is less than the reflection distance set value, the calculating unit generates the warning signal to the signal transmitting unit.

7. The ultrasonic component according to claim 1, wherein the ultrasonic signal transmitting unit and the receiving unit are disposed on two opposite sides of the housing space.

8. The ultrasonic component according to claim 7, wherein the ultrasonic signal transmitting unit emits the ultrasonic forward the receiving unit.

9. The ultrasonic component according to claim 1, wherein when the transmittance rate is larger than the transmittance rate set value, the calculating unit generates the warning signal to the signal transmitting unit.

10. The ultrasonic component according to claim 9, wherein the built-in transmittance rate set value is 0.

11. The ultrasonic component according to claim 7, wherein the ultrasonic has a transmittance wave, when the receiving unit analyzes a speed of the transmittance wave is larger than the speed of the ultrasonic, the receiving unit analyzes the reflection rate by using an equation as follows:

$$R = \frac{(\rho_1 C_1 - \rho_2 C_2)^2}{(\rho_1 C_1 + \rho_2 C_2)^2};$$

wherein R is the refection rate, $\rho_1$ is an air density, $C_1$ is the speed of the ultrasonic, $\rho_2$ is a water density, and $C_2$ is the speed of the transmittance wave; $\rho_1$, $\rho_2$ and $C_1$ are independent and different constant values stored in the receiving unit, and $C_2$ is measured by the receiving unit; when the reflection rate is less than the reflection rate set value, the calculating unit generates the warning signal to the signal transmitting unit.

12. The ultrasonic component according to claim 7, wherein the built-in reflection rate set value is 1.

13. The ultrasonic component according to claim 1, wherein the angle is 5 degrees through 65 degrees.

14. An escape system for a sinking car, which is installed on the car, at least comprising:
the ultrasonic component according to claim 1; and
a main board electrically connected to the ultrasonic component, when the main board receives the warning signal transmitted from signal transmitting unit, the main board is electrically connected to a motor of the car to open at least one car window, and the main board is electrically connected an electromagnetic switch to unlock at least one seat belt.

15. The escape system for the sinking car according to claim 14, further comprising:
an uninterrupted power system which makes power of the escape system for the sinking car be uninterrupted.

16. The escape system for the sinking car according to claim 14, wherein the escape system for the sinking car is electrically connected to a device of the car or a mobile telecommunication apparatus held by a user in the car, the device has a an application installed therein, and when receiving the warning signal, the escape system for the sinking car activates an automatically locating function of the application.

17. The escape system for the sinking car according to claim 16, wherein the application sends a help message or dials a help call via a voice assistant or an automatically dialing function.

18. The escape system for the sinking car according to claim 14, wherein the main board is electrically connected to a speaker of the car, such than the speaker is activated to loud when the main board receives the warning signal.

19. The escape system for the sinking car according to claim 14, wherein the main board has a control unit being electrically connected to the motor, headlights and at least a speaker.

* * * * *